United States Patent
Chen et al.

(10) Patent No.: US 8,477,216 B2
(45) Date of Patent: Jul. 2, 2013

(54) IMAGE CAPTURING APPARATUS AND BOOTING METHOD THEREOF

(75) Inventors: Chien-Hung Chen, Changhua County (TW); Chieh-Chun Lo, Hsinchu (TW)

(73) Assignee: Altek Corporation, Hsinchu (TW)

( * ) Notice: Subject to any disclaimer, the term of this patent is extended or adjusted under 35 U.S.C. 154(b) by 238 days.

(21) Appl. No.: 13/041,447

(22) Filed: Mar. 7, 2011

(65) Prior Publication Data

US 2012/0169898 A1     Jul. 5, 2012

(30) Foreign Application Priority Data

Dec. 29, 2010 (TW) .............................. 99146620 A

(51) Int. Cl.
*H04N 5/76* (2006.01)
(52) U.S. Cl.
USPC ..................................... 348/231.3; 348/231.9
(58) Field of Classification Search
USPC .................. 348/231.99, 231.1, 231.2, 231.3, 348/231.6, 231.7, 231.8
See application file for complete search history.

(56) References Cited

U.S. PATENT DOCUMENTS

| 6,981,136 B2 | 12/2005 | Fuse et al. |
| 7,477,296 B2 * | 1/2009 | Okumura .................. 348/231.99 |
| 8,189,071 B2 * | 5/2012 | Murai ......................... 348/231.2 |

FOREIGN PATENT DOCUMENTS

| TW | I220040 | 8/2004 |
| TW | 200832132 | 8/2008 |
| TW | I301574 | 10/2008 |

* cited by examiner

Primary Examiner — Timothy J Henn
(74) Attorney, Agent, or Firm — Jianq Chyun IP Office

(57) ABSTRACT

An image capturing apparatus and a booting method thereof are provided. In the method, a power-on signal is received, and then memory card plug information is read to determine whether a memory card of the image capturing apparatus has been plugged out in a power-off period of the image capturing apparatus. If it is determined that the memory card has not been plugged out, a previously recorded free space and a previously recorded file index table of the memory card are directly read, so as to accordingly boot the image capturing apparatus. If it is determined that the memory card has been plugged out, the free space of the memory card is re-calculated and a file sorting procedure is executed to generate the file index table, so as to accordingly boot the image capturing apparatus.

7 Claims, 3 Drawing Sheets

IMAGE CAPTURING APPARATUS AND BOOTING METHOD THEREOF

CROSS-REFERENCE TO RELATED APPLICATION

This application claims the priority benefit of Taiwan application serial no. 99146620, filed Dec. 29, 2010. The entirety of the above-mentioned patent application is hereby incorporated by reference herein and made a part of this specification.

BACKGROUND OF THE INVENTION

1. Field of the Invention

The present invention relates to an image capturing apparatus and a booting method thereof, in particular, to an image capturing apparatus and a booting method thereof capable of shortening boot time.

2. Related Art

With development of digital technology, a conventional camera using a negative film to record an image has gradually been replaced by a digital camera using a digital media, such as a memory card, to record the image. Nowadays, the digital camera is made into an increasingly smaller size, so as to be conveniently carried on by a user. In another aspect, the memory card of the digital camera has an increasingly larger capacity, so as to record more images and enable the user to completely record larger capacity, so as to record more images and enable the user to completely record events happening at any moment in any shooting circumstances.

However, the real situation is that many events happen quite suddenly, so that an opportunity for the user to take a photo with the camera is fleeting. In order to capture a wonderful moment, boot speed of the digital camera is relatively important.

Generally, after the boot-up of the digital camera, it is necessary to obtain two pieces of information as follows: free exposures after entering a photographic mode, and a file name and a path of the last photo. In order to obtain the two pieces of information, each time when being booted, the digital camera has to calculate a free space of a storage card and execute a file sorting procedure, so as to accordingly establish a file index table. After obtaining the two pieces of information, the digital camera can enter the photographic mode and be used by the user for taking a photo.

In calculating the free space of the storage card, the larger the capacity of the memory card is, the more time is taken; in another aspect, in executing the file sorting procedure, the more the number of files stored in the memory card is, the more time is taken. The time required by the two procedures influences the time from pressing of the power key by the user to the actual photographing, and is also the key deciding whether the camera can capture a real-time picture. Thus, how to shorten the boot time has become a major issue in the field of digital camera technology.

SUMMARY OF THE INVENTION

Accordingly, the present invention is directed to an image capturing apparatus and a booting method thereof, capable of shortening boot time of the image capturing apparatus.

The present invention provides a booting method of an image capturing apparatus, which is applicable to an image capturing apparatus using a memory card. In the method, a power-on signal is received, and then memory card plug information is read to determine whether a memory card has been plugged out in a power-off period of the image capturing apparatus. If it is determined that the memory card has not been plugged out, a previously recorded free space and a previously recorded file index table of the memory card are directly read, so as to accordingly boot the image capturing apparatus. If the memory card has been plugged out, the free space of the memory card is re-calculated and a file sorting procedure is executed to generate the file index table, so as to accordingly boot the image capturing apparatus.

In an embodiment of the present invention, the booting method further includes detecting whether the memory card has been plugged out in the power-off period of the image capturing apparatus, and accordingly recording the memory card plug information, in which the recorded memory card plug information is recorded in a Real Time Clock (RTC) circuit of the image capturing apparatus.

In an embodiment of the present invention, the step of recording the memory card plug information includes executing a boot code of the image capturing apparatus, and accordingly recording the memory card plug information through the boot code.

In an embodiment of the present invention, after the step of booting the image capturing apparatus, the booting method further includes receiving a power-off signal, then recording the current free space and the file index table of the image capturing apparatus in a second storage unit of the image capturing apparatus, and finally powering off the image capturing apparatus.

The present invention further provides an image capturing apparatus, which includes a light sensor, a memory card slot, a memory card detecting circuit, a first storage unit, a second storage unit, and a processing unit. The light sensor is applicable to capturing an image. The memory card is applicable to being plugged into the memory card slot, so as to store the image captured by the light sensor. The memory card detecting circuit is used for detecting whether the memory card is plugged into the memory card slot, so as to accordingly generate memory card plug information. The first storage unit is used for recording the memory card plug information, and the second storage unit is used for recording a free space and a file index table of the memory card. The processing unit is coupled to the light sensor, the memory card slot, the memory card detecting circuit, the first storage unit, and the second storage unit, and is applicable to receiving a power-on signal and then reading the memory card plug information recorded by the first storage unit, so as to determine whether the memory card has been plugged out in a power-off period of the image capturing apparatus, in which if it is determined that the memory card has not been plugged out, the processing unit directly reads the free space and the file index table previously recorded in the second storage unit, so as to accordingly boot the image capturing apparatus; and if it is determined that the memory card has been plugged out, the processing unit re-calculates the free space of the memory card and executes a file sorting procedure to generate the file index table, so as to accordingly boot the image capturing apparatus.

In an embodiment of the present invention, the memory card detecting circuit detects whether the memory card has been plugged out in the power-off period of the image capturing apparatus, and accordingly records the memory card plug information in the first storage unit, in which the storage unit is an RTC circuit.

In an embodiment of the present invention, the memory card detecting circuit detects that the memory card has been plugged out and then controls the processing unit to execute a boot code of the image capturing apparatus, so as to record the memory card plug information in the first storage unit through the boot code.

In an embodiment of the present invention, the processing unit further receives a power-off signal, then records the free space and the file index table of the image capturing apparatus in the second storage unit, and powers off the image capturing apparatus.

Based on the above, in the image capturing apparatus and the booting method thereof according to the present invention, a free space and a file index table of a memory card are previously recorded when the image capturing apparatus is powered off, and are directly read out at next power-on without re-calculation. Thus, boot time of the image capturing device can be shortened. Furthermore, in the present invention, an additional hardware circuit is further used for detecting whether the memory card has been plugged out in a power-off period of the image capturing apparatus, so as to decide whether to boot the image capturing apparatus by reading the previously recorded information, thereby avoiding inconsistency of the read data and the memory card.

In order to make the aforementioned features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE EMBODIMENTS

In order to shorten the time expended by an image capturing apparatus from pressing of a power key to actual photographing, in the present invention, memory card information required for next boot-up, especially information obtained after a long time or through a large amount of calculation, is previously stored in an internal storage device when the image capturing apparatus is powered off Then, at the next boot-up, the memory card information is directly read from the internal storage device. Thus, the time spent by the image capturing apparatus in calculating a free space and executing a file sorting procedure can be saved.

Figure 1:
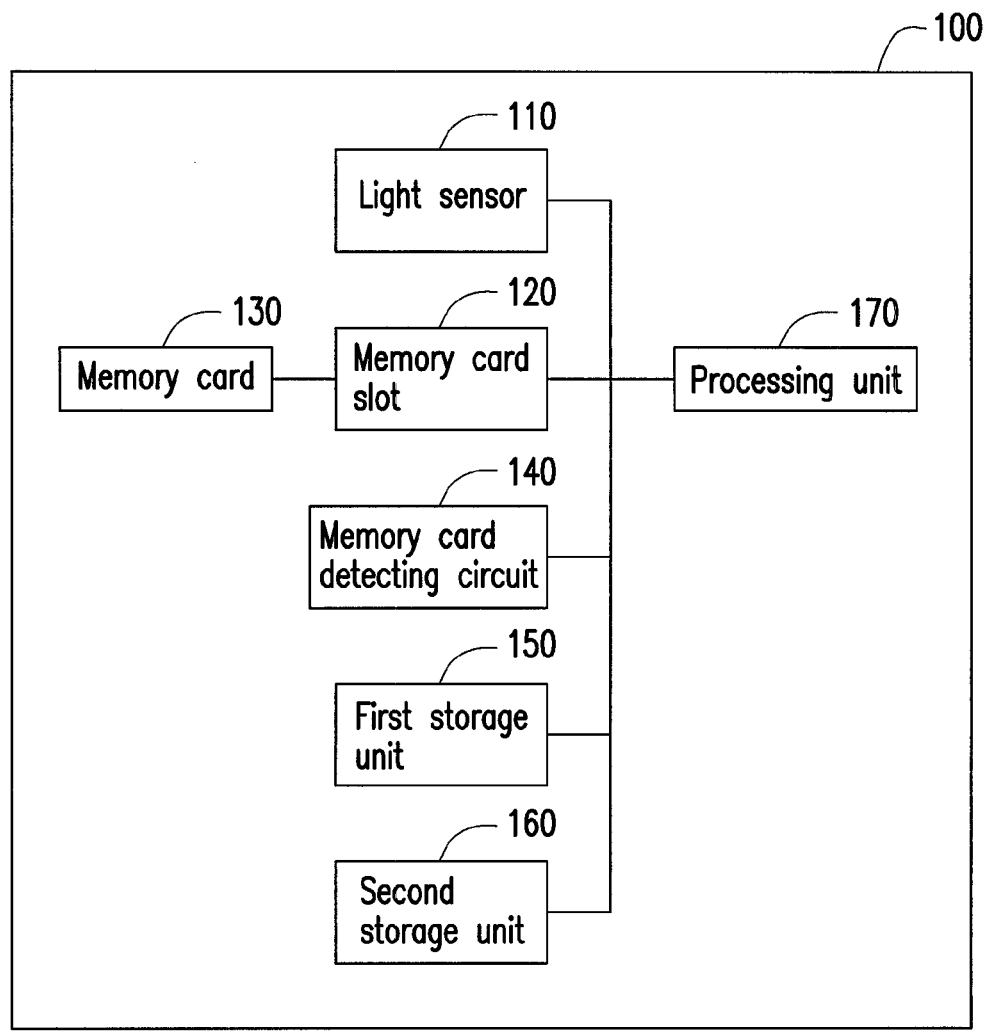
FIG. 1 is a block diagram of an image capturing apparatus according to an embodiment of the present invention.

FIG. 1 is a block diagram of an image capturing apparatus according to an embodiment of the present invention. Referring to FIG. 1, the image capturing apparatus 100 according to this embodiment is, for example, an electronic device having an image capturing function, such as a digital camera, a cell phone, a Personal Digital Assistant (PDA), or a notebook computer. The image capturing apparatus 100 includes a light sensor 110, a memory card slot 120, a memory card 130, a memory card detecting circuit 140, a first storage unit 150, a second storage unit 160, and a processing unit 170, and functions thereof are as follows.

The light sensor 110 is, for example, a Charge Coupled Device (CCD) or a Complementary Metal-Oxide Semiconductor (CMOS), and can be used for capturing an image; the memory card 130 is, for example, a Compact Flash (CF) memory card, a Secure Digital (SD) memory card, a Memory Stick (MS) memory card, or other kinds of memory cards, is applicable to being plugged into the memory card slot 120, and can be used for storing the image captured by the light sensor 110; the first storage unit 150 is, for example, an RTC circuit, and is used for recording memory card plug information; the second storage unit 160 is, for example, any type of a fixed or a mobile Random Access Memory (RAM), Read-Only Memory (ROM), or Flash memory, and is used for recording a free space and a file index table of the memory card. In another embodiment, the first storage unit 150 and the second storage unit 160 may also be different blocks in the same memory and are not limited herein.

The processing unit 170 is, for example, a Central Processing Unit (CPU), or other programmable microprocessor, Digital Signal Processor (DSP), programmable controller, Application Specific Integrated Circuit (ASIC), Programmable Logical Device (PLD), or other similar devices. The processing unit 170 is respectively coupled to the light sensor 110, the memory card slot 120, the memory card detecting circuit 140, the first storage unit 150, and the second storage unit 160, and can be used for executing the booting method of the image capturing apparatus according to the present invention.

Figure 2:
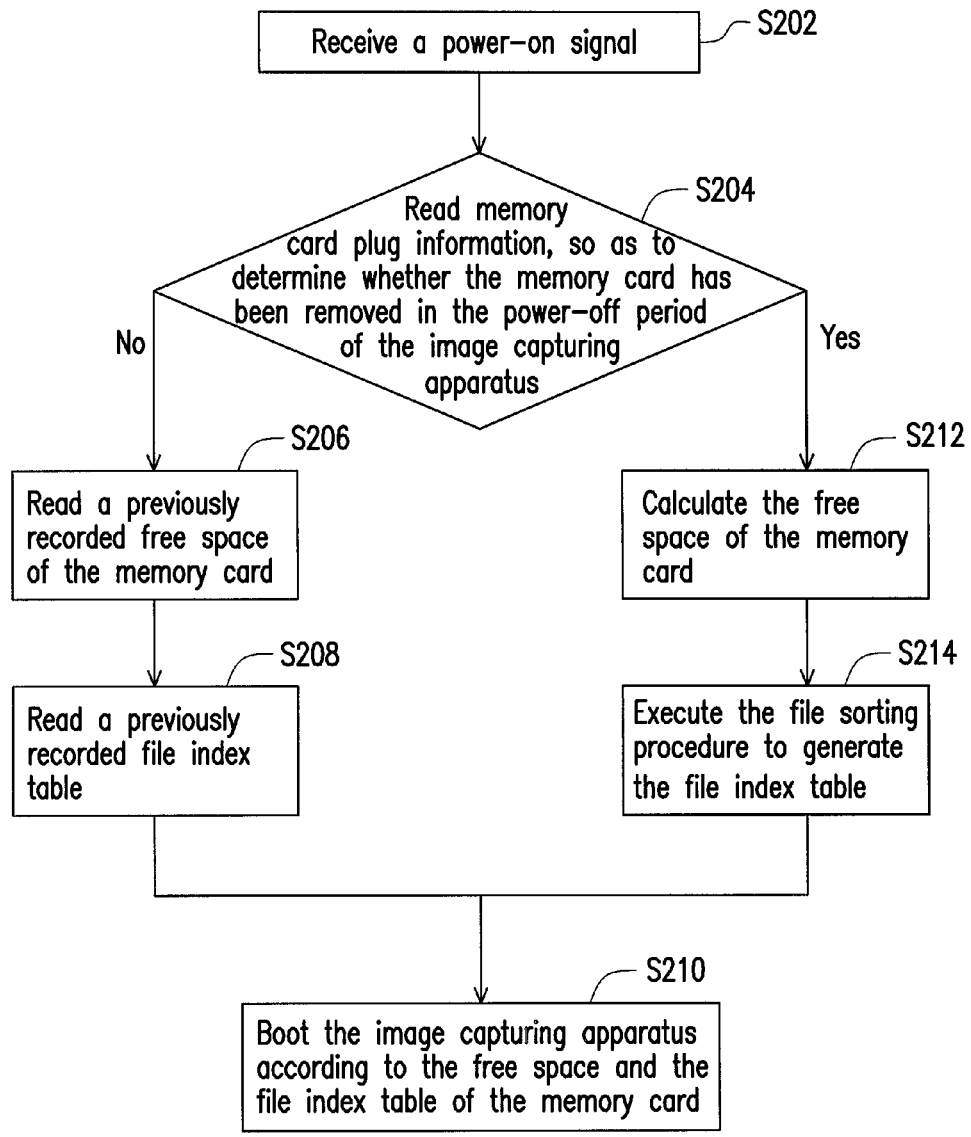
FIG. 2 is a flow chart of a booting method of an image capturing apparatus according to an embodiment of the present invention.

FIG. 2 is a flow chart of a booting method of an image capturing apparatus according to an embodiment of the present invention. Referring to FIGS. 1 and 2 at the same time, the method according to the present invention is applicable to the image capturing apparatus 100 in FIG. 1. The detailed steps of the method according to the present invention are described hereinafter in detail with reference to the elements in FIG. 1.

First, the processing unit 170 receives a power-on signal (Step S202). After a user presses a power key (not shown) of the image capturing apparatus 100, the image capturing apparatus 100 generates a power-on signal, and transmits the power-on signal to the processing unit 170, so as to control the processing unit 170 to carry out a boot procedure of the image capturing apparatus.

Here, the processing unit 170 reads the memory card plug information stored in the first storage unit 150, so as to determine whether the memory card 130 has been plugged out in the power-off period of the image capturing apparatus 100 (Step S204). In this embodiment, a memory card detecting circuit 140 is additionally designed, which is capable of detecting whether the memory card 130 has been plugged out or re-plugged into the image capturing apparatus 100 in the power-off state.

The memory card detecting circuit 140 is, for example, a gold finger configured in the memory card slot 120 or configured on a protective cover of the memory card slot 120, and can generate a trigger signal when the memory card 130 is plugged out of the memory card slot 120 or plugged into the memory card slot 120 or when the user opens or closes the protective cover of the memory card slot 120, so as to accordingly generate the memory card plug information. The memory card plug information is, for example, recorded in a form of flag in the RTC circuit (that is, the first storage unit 150) in the image capturing apparatus 100, and may be read by the image capturing apparatus 100 when the image capturing apparatus is booted, and is accordingly used as power-on information.

Figure 3:
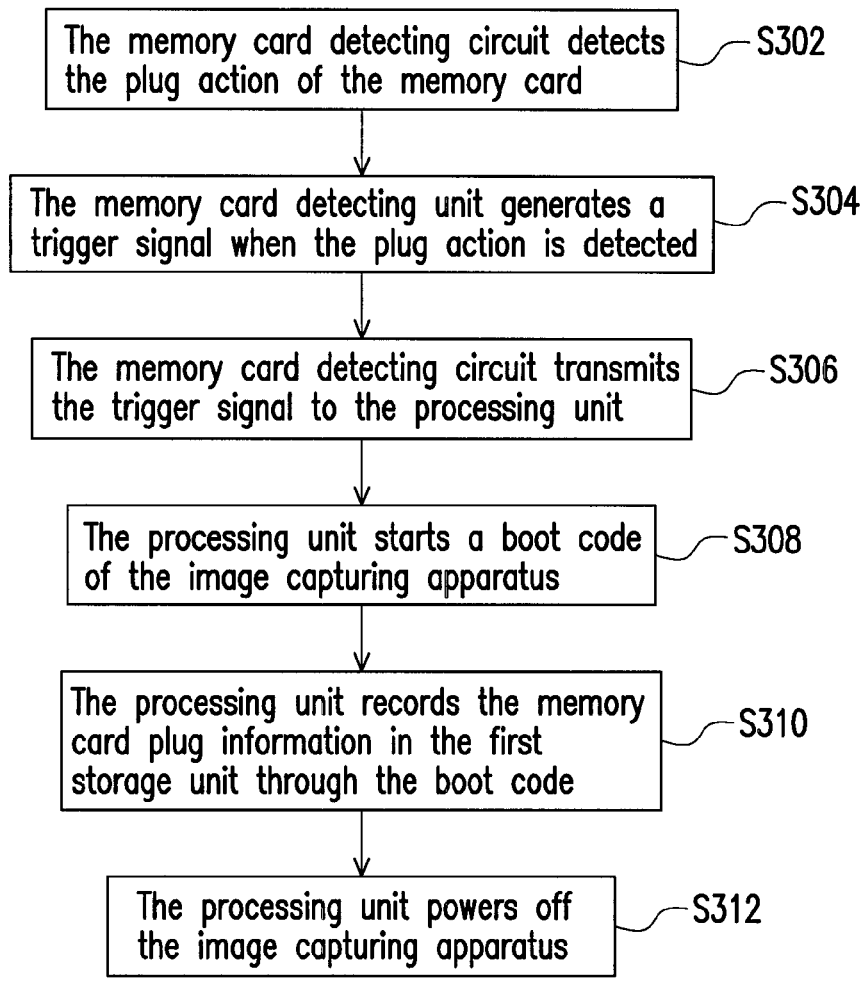
FIG. 3 is a flow chart of a method for recording memory card plug information according to an embodiment of the present invention.

Specifically, FIG. 3 is a flow chart of a method for recording memory card plug information according to an embodiment of the present invention. Referring to FIG. 3, in the method of this embodiment, in the power-off period of the image capturing apparatus 100, the memory card detecting circuit 140 detects the plug action of the memory card 130 (Step S302). When the user opens the protective cover of the memory card slot 120 or plugs out the memory card 130 from the memory card slot 120, the memory card detecting circuit 140 generates a trigger signal (Step S304), and transmits the trigger signal to the processing unit 170 (Step S306).

At this time, the processing unit 170 executes a boot code of the image capturing apparatus 100 (Step S308), records the memory card plug information in the first storage unit 150 through the boot code (Step S310), and finally powers off the image capturing apparatus 100 (Step S312).

Through the above steps, the processing unit 170 can know whether the memory card 130 has been plugged out in the power-off period through the memory card plug information, so as to accordingly decide whether to boot the image capturing apparatus by using the previously recorded information.

If determining that the memory card 130 has not been plugged out in the power-off period, the processing unit 170 directly reads the free space (Step S206) and the file index table (Step S208) previously recorded in the second storage unit 160, so as to accordingly boot the image capturing apparatus 100 (Step S210). The free space and the file index table of the memory card 130 are necessary information required for booting the image capturing apparatus 100. Thus, calculation of the free space and establishment of the file index table are necessary procedures executed for booting the image capturing apparatus 100. In order to shorten boot time, in this embodiment, execution results of the two procedures are recorded in an internal storage device (that is, the second storage unit 160) of the image capturing apparatus when the image capturing apparatus is powered off, so as to be read and used by the processing unit 170 when the image capturing apparatus is booted.

Figure 4:
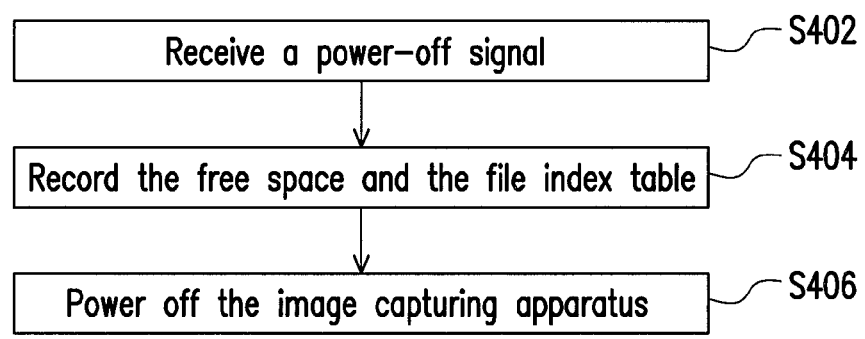
FIG. 4 is a flow chart of a method for establishing power-on information according to an embodiment of the present invention.

Specifically, FIG. 4 is a flow chart of a method for establishing power-on information according to an embodiment of the present invention. Referring to FIG. 4, in the method of this embodiment, the processing unit 170 receives a power-off signal (Step S402). When the user presses the power key of the image capturing apparatus 100 in the power-on state of the image capturing apparatus 100, the image capturing apparatus 100 generates a power-off signal, and transmits the power-off signal to the processing unit 170, so as to control the processing unit 170 to carry out the power-off procedure of the image capturing apparatus 100.

At this time, the processing unit 170 records the current free space and the file index table in the second storage unit 160 (Step S404) and finally powers off the image capturing apparatus 100 (Step S406). The processing unit 170 calculates and updates the free space and the file index table of the first storage unit 150 in real time after the image capturing apparatus 100 captures the image each time, so as to provide a basis for the image capturing apparatus 100 in capturing a next image. In this embodiment, the current free space and the file index table are previously stored before the image capturing apparatus 100 is powered off, so as to establish the power-on information, and the power-on information is directly read each time when the image capturing apparatus is booted, so as to boot the image capturing apparatus without re-calculating the free space or executing the file sorting procedure. Thus, the time required for booting the image capturing apparatus can be shortened.

In another aspect, in Step S204 in FIG. 2, if the processing unit 170 determines that the memory card 130 has been plugged out in the power-off period of the image capturing apparatus 100, it indicates that the memory card 130 has possibly been replaced. In order to avoid inconsistency of the previously recorded power-on information and the currently used memory card 130, the processing unit 170 chooses to neglect the information in the second storage unit 160, re-calculates the free space (Step S212) of the memory card 130, and executes the file sorting procedure to generate the file index table (Step S214), so as to accordingly boot the image capturing apparatus 100 (Step S210).

Through the above booting method, the calculation procedure required for the boot-up can be omitted, thereby achieving the effect of shortening the boot time. For example, supposing the previous time of the image capturing apparatus from the pressing of the power key by the user to the actual photographing is 3000 milliseconds, the time required for calculating the free space of the memory card is 1500 milliseconds, the time required for executing the file sorting procedure is 106 milliseconds, and the time required for the image capturing apparatus to directly read the free space and the file index table from the internal storage device is 35 milliseconds. Through the booting method according to the present invention, the boot time of the image capturing apparatus can be shortened to 3000−1500−106+35=1429 milliseconds.

To sum up, in the image capturing apparatus and the booting method thereof according to the present invention, the information generated by the procedure required to be executed for booting the image capturing apparatus is previously stored when the image capturing apparatus is powered off, so that the image capturing apparatus can obtain the power-on information in real time when the image capturing apparatus is booted, thereby omitting the calculation step and shortening the boot time. Furthermore, in the present invention, a hardware circuit is used for detecting whether the memory card has been plugged in the power-off period of the image capturing apparatus, so as to decide whether to boot the image capturing apparatus by using the previously calculated power-on information, thereby ensuring the consistency of the power-on information and the memory card.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A booting method of an image capturing apparatus, applicable to an image capturing apparatus using a memory card, comprising:
   receiving a power-on signal;
   reading memory card plug information to determine whether the memory card has been plugged out in a power-off period of the image capturing apparatus;
   if the memory card has not been plugged out, directly reading a previously recorded free space and a previously recorded file index table of the memory card, so as to accordingly boot the image capturing apparatus;
   if the memory card has been plugged out, re-calculating the free space of the memory card and executing a file sorting procedure to generate the file index table, so as to accordingly boot the image capturing apparatus; and detecting whether the memory card has been plugged out in the power-off period of the image capturing apparatus, and accordingly recording the memory card plug information, wherein the step of recording the memory card plug information comprises:

executing a boot code of the image capturing apparatus; and recording the memory card plug information through the boot code.

2. The booting method of an image capturing apparatus according to claim 1, wherein the memory card plug information is recorded in a Real Time Clock (RTC) circuit of the image capturing apparatus.

3. The booting method of an image capturing apparatus according to claim 1, wherein after the step of booting the image capturing apparatus, the method further comprises:

receiving a power-off signal;

recording the free space and the file index table; and powering off the image capturing apparatus.

4. An image capturing apparatus, comprising:

a light sensor, configured to capturing an image;

a memory card slot;

a memory card, configured to being plugged into the memory card slot, so as to store the image captured by the light sensor;

a memory card detecting circuit, configured to detect whether the memory card is plugged into the memory card slot, so as to accordingly generate memory card plug information;

a first storage unit, configured to record the memory card plug information;

a second storage unit, configured to record a free space and a file index table of the memory card; and a processing unit, coupled to the light sensor, the memory card slot, the memory card detecting circuit, the first storage unit, and the second storage unit, and configured to receive a power-on signal and then read the memory card plug information recorded by the first storage unit, so as to determine whether the memory card has been plugged out in a power-off period of the image capturing apparatus, wherein if the memory card has not been plugged out, the processing unit directly reads the free space and the file index table previously recorded in the second storage unit, so as to accordingly boot the image capturing apparatus;

if the memory card has been plugged out, the processing unit re-calculates the free space of the memory card and executes a file sorting procedure to generate the file index table, so as to accordingly boot the image capturing apparatus, and when detecting that the memory card has been plugged, the memory card detecting circuit controls the processing unit to execute a boot code of the image capturing apparatus, so as to record the memory card plug information in the first storage unit through the boot code.

5. The image capturing apparatus according to claim 4, wherein the memory card detecting circuit detects whether the memory card has been plugged out in the power-off period of the image capturing apparatus, and accordingly records the memory card plug information in the first storage unit.

6. The image capturing apparatus according to claim 4, wherein the first storage unit is a Real Time Clock (RTC) circuit.

7. The image capturing apparatus according to claim 4, wherein the processing unit further receives a power-off signal, then records the free space and the file index table of the image capturing apparatus in the second storage unit, and powers off the image capturing apparatus.

* * * * *